US007454830B2

(12) United States Patent
Pittau et al.

(10) Patent No.: US 7,454,830 B2
(45) Date of Patent: Nov. 25, 2008

(54) APPARATUS WITH TWISTING TOOL HAVING CAVITIES AND ASSOCIATED RETAINING PARTS FOR MANUFACTURING ELECTRICAL HARNESSES

(75) Inventors: Serge Pittau, La Bouilladisse (FR); Christian Tourenq, Gemenos (FR)

(73) Assignee: Eurocopter, Marignane (FR)

( * ) Notice: Subject to any disclaimer, the term of this patent is extended or adjusted under 35 U.S.C. 154(b) by 273 days.

(21) Appl. No.: 11/304,715

(22) Filed: Dec. 16, 2005

(65) Prior Publication Data

US 2006/0143903 A1 Jul. 6, 2006

(30) Foreign Application Priority Data

Dec. 30, 2004 (FR) .................................. 04 14095

(51) Int. Cl.
*B23P 19/00* (2006.01)

(52) U.S. Cl. ............................ 29/748; 29/749; 29/755; 29/759; 29/761; 29/33 M

(58) Field of Classification Search ........... 29/745–749, 29/564.1–564.4, 271, 278, 750–762; 140/149, 140/119, 120, 115; 57/314, 294, 311; 72/235, 72/247; 100/31, 189
See application file for complete search history.

(56) References Cited

U.S. PATENT DOCUMENTS

| | | | | |
|---|---|---|---|---|
| 1,293,880 | A * | 2/1919 | Neville | 140/119 |
| 2,768,428 | A | 10/1956 | MacGregor et al. | |
| 3,884,276 | A * | 5/1975 | Poplaski | 140/115 |
| 3,889,455 | A * | 6/1975 | Portinari et al. | 57/7 |
| 3,930,524 | A * | 1/1976 | Tarbox | 140/93 R |
| 4,269,023 | A * | 5/1981 | Garner | 57/1 UN |
| 5,012,624 | A * | 5/1991 | Dahlgren | 52/506.06 |
| 5,052,450 | A * | 10/1991 | Williams | 140/149 |
| 5,205,329 | A | 4/1993 | Suzuki et al. | |
| 6,842,975 | B2 * | 1/2005 | Revel et al. | 29/842 |
| 2006/0143903 | A1 * | 7/2006 | Pittau et al. | 29/749 |
| 2006/0148277 | A1 * | 7/2006 | Pittau et al. | 439/34 |

FOREIGN PATENT DOCUMENTS

| | | |
|---|---|---|
| DE | 30 06 699 | 8/1981 |
| EP | 0 586 252 | 3/1994 |
| WO | WO0182313 | 11/2001 |

* cited by examiner

*Primary Examiner*—Minh Trinh
(74) *Attorney, Agent, or Firm*—Young & Thompson

(57) ABSTRACT

The present invention relates to apparatus for manufacturing a harness of electrically conductive wire segments, the apparatus comprising a twisting tool (20) having at least two cavities (31 to 38), each cavity being associated with retaining means (43, 44) enabling at least a portion of a wire segment to be retained in the cavity, release means enabling said wire segment portion to be extracted from the cavity, and opening means (46) enabling said wire segment portion to be inserted into the cavity.

14 Claims, 4 Drawing Sheets

Fig.1
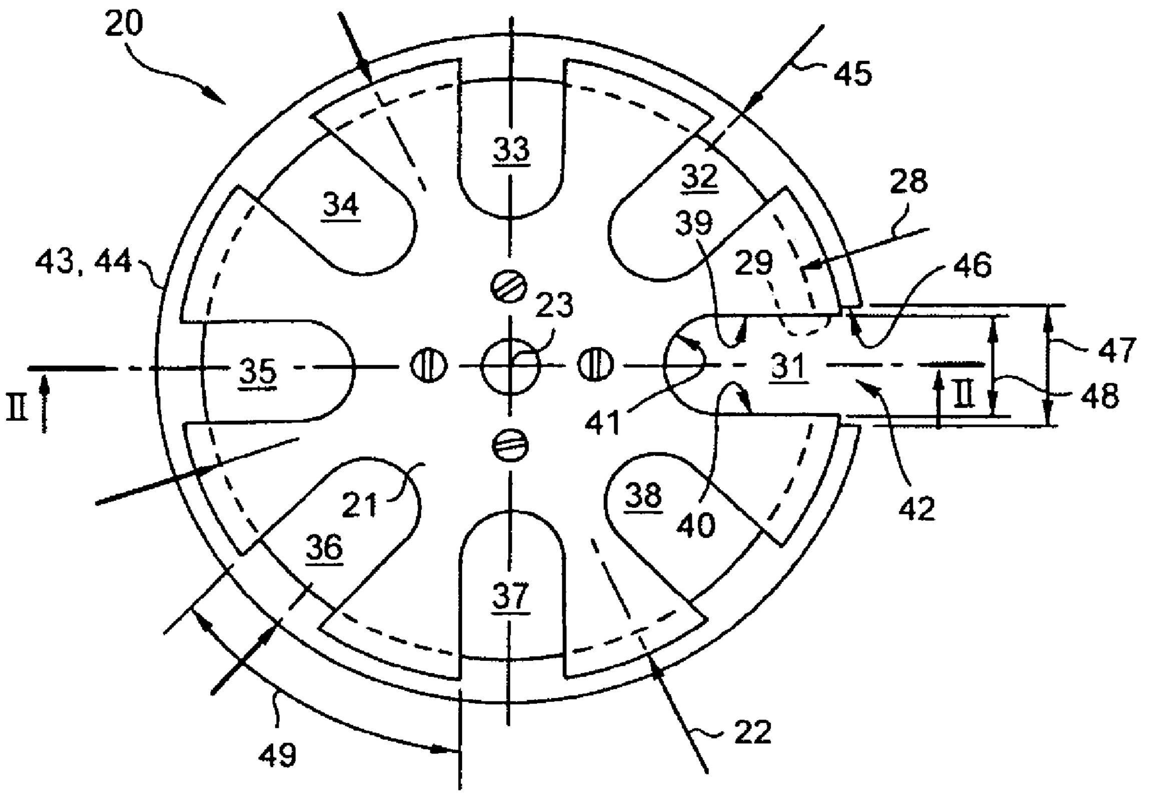
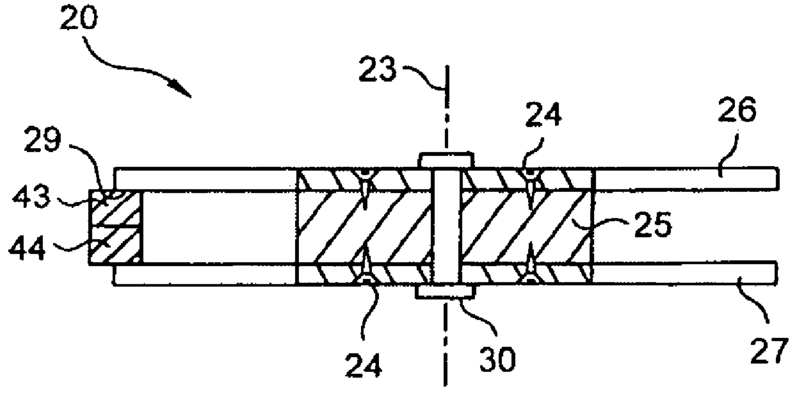
Fig.2

APPARATUS WITH TWISTING TOOL HAVING CAVITIES AND ASSOCIATED RETAINING PARTS FOR MANUFACTURING ELECTRICAL HARNESSES

FIELD OF THE INVENTION

The present invention relates to a method of manufacturing electrical bundles (or harnesses), to apparatus adapted to such manufacture, and to electrical bundles or harnesses obtained thereby.

The technical field of the invention is that of manufacturing electrical harnesses for rotary wing aircraft.

BACKGROUND OF THE INVENTION

A helicopter is commonly fitted with one or more hundreds of electrical harnesses, and they can all be different from one another.

An electrical harness is usually made up of lengths of sheathed (insulated) electrically conductive wire collected together and/or tied together so as to form distinct portions, or branches, of the harness; the harness also generally comprises one (or more) electrical connectors disposed at a free end of at least one of the branches; each connector is mechanically secured to the end of at least one of the wire segments forming the branch in question; a connector includes at least one male or female electrical connection member (or terminal) which is in electrical contact with the end of one of the segments of wire, e.g. by being crimped thereto, and possibly after said end has been stripped.

Manufacturing a harness essentially consists in bringing together and/or uniting wire segment portions so as to build up the branches of the harness, and in fitting suitable connectors to the ends of the branches of the harness, where appropriate.

The manufacture of an electrical harness for a helicopter generally also includes an operation of providing the branches with electromagnetic or mechanical protection by means of a braided sheath.

Such protection makes the harness stiff, and thus makes it difficult to put the harness into place. To mitigate this drawback and to leave a degree of flexibility to the harness, it is necessary to twist the cables making it up prior to braiding on the sheath.

As a general rule, in order to manufacture a harness, use is made of a plane support, such as a bench or table, to support the electrical harness; the table may be fitted with a jig on which there appears a representation of the path to be followed by the wires or cables of the harness, as described in particular in patent application FR 2 808 374 and WO 01/82313; an operator places segments of wire on the jig in compliance with the representation, and then makes the electrical connections to the ends of the branches of the harness.

A drawback of that technique is that it requires the use of a table and a jig of shape and dimensions that match those of the harness when complete and deployed (“spread out”).

In order to provide assistance in putting the wire segments into place and in keeping them on the support or jig, it is possible to fit the jig with guide pegs that serve to form bends or bifurcations in the deployed harness; it is also possible to use clamps for holding each end of a wire segment, as described in particular in U.S. Pat. No. 5,205,329.

Such devices for manufacturing electrical harnesses are complex and bulky; they are unsuitable for manufacturing helicopter electrical harnesses which can have ten or more branches, and which can extend over a length of ten or more meters.

Such devices also do not make it easy to twist the wires of the harness; when such twisting is performed manually, the wires do not wind into a regular helix; in particular, when the branch and/or the harness to be twisted has a first wire of large section and a second wire of smaller section, the first wire tends to oppose twisting, and as a result, manual twisting of such a branch or of such a harness generally leads to the second wire winding around the first wire which does not itself become helically shaped; because of this lack of twisting, harmful stress can arise in one or more wire segments when the harness is bent or curved.

OBJECTS AND SUMMARY OF THE INVENTION

An object of the invention is to propose a method and apparatus for manufacturing electrical harnesses, which method and apparatus are improved and/or remedy at least in part the drawbacks and/or the shortcomings of known methods and apparatuses for manufacturing electrical harnesses.

An object of the invention is also to provide improved electrical harnesses.

In a first aspect of the invention, there is provided an electrical bundle or harness comprising at least two segments of electrically conductive wire that are twisted regularly (stranded).

In another aspect of the invention, apparatus is provided for manufacturing electrical harnesses, the apparatus including a tool for twisting (stranding) segments of electrically conductive wire in substantially regular manner.

According to yet another aspect of the invention, a method is provided of manufacturing an electrical harness in which at least two wire segments of the harness are twisted (stranded) in substantially regular manner.

The invention confers increased flexibility on the harness (i.e. greater capacity for deformation), thereby reducing the mechanical stresses imposed on the wire segments when they are bent or curved; each segment of twisted wire adopts a spiral shape, while being subjected to substantially no twisting along its own longitudinal axis.

Preferably, each branch of the electrical harness is twisted in succession; for this purpose, it is preferable to use a twisting tool including (at least) two cavities, each cavity being associated with retaining means enabling at least a portion of a wire segment to be held in the cavity, together with release means enabling said portion of wire segment to be released from the cavity, and opening means enabling said wire segment portion to be inserted into the cavity.

The twisting tool preferably also comprises a body substantially presenting circular symmetry about an axis (of symmetry), in particular a body presenting the general shape of a sphere, a cylinder, or a disk; the body of the tool presents slots or notches forming said cavities, extending substantially parallel to the axis of symmetry of the body and each opening out into the outside surface of the body via a peripheral opening, the body thus somewhat resembling the cylinder of a revolver.

These notches or slots are preferably substantially regularly distributed around the periphery of the body.

The body preferably presents at least four cavities or slots, in particular at least eight cavities or slots, of shape and dimensions that are substantially identical and (each) suitable for receiving a plurality of wire segments.

The wires engaged in and distributed amongst the slots of the tool and each having one end (temporarily) secured to a support forming part of the apparatus of the invention, are twisted by turning the tool about its own axis of symmetry, where this turning operation can be performed manually by an operator.

In order to enable the operator to estimate or measure the angle of rotation of the tool and/or the number of turns made by the tool, the tool preferably includes a visual rotation marker disposed close to the periphery of the tool body.

The retaining means, the release means, and the opening means may optionally be associated, and they can take on a variety of forms, in particular the form of an elastically deformable tongue extending across the peripheral opening of each respective slot, or a "flapping" panel extending across said opening and hinged relative to the tool body via a double-acting hinge and urged towards a position for closing the opening of the slot by return means such as a spring.

In a preferred embodiment, the retaining, release, and opening means of the twisting tool comprise a ring mounted to pivot around the body of the tool about said axis of symmetry; the ring is interrupted (open) over a portion corresponding substantially to the size of the peripheral opening of one of the slots; the ring is mounted on the body so as to close the openings of the slots in the tool with the exception of no more than one slot having its peripheral opening in register with the interrupted portion or gap of the ring; under such circumstances, the fraction of the periphery of the body associated with each slot preferably presents a dimension (arc length in the outside surface of the tool body) that is greater than or equal to the arc length of the interruption or gap provided in the ring; thus, regardless of the angular position of the ring relative to the tool body, no more than one slot can be open at a time; in particular, the length of the interruption in each ring is substantially equal to the arc length along which each slot opening extends.

Also preferably, the tool has two such rings for selectively opening one of the slots, which rings are mounted to pivot coaxially relative to the tool body, with the pivoting of a first one of the two rings being independent of the pivoting of a second one of the two rings.

This makes it possible to place the two respective interruptions of the two rings successively one and then the other in register with the peripheral opening of a predetermined slot in order to release the wire segments extending through said slot; because of the presence of two independent interrupted rings, moving the interruption in only one of the two pivoting rings into register with the opening in a slot does not allow the wire segments engaged therein to be released; this makes it possible to avoid a set of wire segments being released accidentally when the interruption in only one of the two rings passes in register with the opening of the slot receiving said batch of wire segments.

The apparatus of the invention preferably also includes a harness support such as a table that is elongate along a longitudinal axis of the support, together with slider means extending parallel to said axis and designed to receive a sliding support for the tool for twisting the wires of the harness.

The twisting tool support can thus slide along the axis of the harness support; the apparatus preferably also includes lock means for holding the twisting tool support in position at any point along the slider means.

The twisting tool support presents a configuration that is suitable for receiving and holding the twisting tool in position; the tool support may, in particular, present a portion in the form of an arc or cradle of shape that is complementary to the outside shape of the tool.

In another aspect of the invention, there is provided an apparatus for manufacturing electrical harnesses, the apparatus comprising a harness support such as a table that is elongate along a longitudinal axis of the harness support, a connector support disposed at a first longitudinal end of the harness support, a member for fastening a connector on the connector support, and a graduated rule secured to the harness support and extending parallel to the longitudinal axis of said support.

The connector support and the member for fastening a connector that is associated therewith enable a harness to be secured to the harness support, providing the harness has a branch fitted at its end with a connector; thereafter, the wire segments extending from the connector can be laid out along the harness support parallel to its longitudinal axis; these wire segments can then be twisted by using a twisting tool, moving said tool along the harness support while causing said tool to rotate and verifying the length of the twisted portion extending from the connector that is secured to the harness support by means of the rule.

When a predetermined length of harness corresponding to the length of the branch fitted with the connector (referred to as the first branch) has been twisted in this way, then the wire segments for forming a second branch are separated from the wire segments that are to form a third branch; the wire segments for forming the second branch are temporarily secured to the harness support; the wire segments of the third branch are extended onwards from the first branch and the wires of the third branch are twisted; thereafter, and where appropriate, at least one connector is fitted to the free end of said third branch and then the second branch is treated in the same manner after separating the wire segments of said branch from the harness support.

Thus, the manufacture of the various branches of the twisted harness takes place substantially along a single axis, i.e. substantially along the longitudinal axis of the harness support (which is preferably horizontal).

When the length of the harness to be made is longer than the length of the harness support, a (first) harness guide member is placed at the second end of the harness support, thereby enabling the harness to be turned through approximately 180° about the guide member.

Manufacture of the harness can then be continued in the same manner as that described above, laying out the remaining portion for manufacture of the harness along a second longitudinal axis parallel to the longitudinal axis of the harness support and lying at a short distance (e.g. a few centimeters) from said harness support axis.

When the length of the harness is more than twice the length of the harness support, then a second harness guide member is secured to the first end of the harness support in the vicinity of said connector support, where the second harness guide member is similar or identical to the first harness guide member.

BRIEF DESCRIPTION OF THE DRAWINGS

Other characteristics and advantages of the invention appear from the following description which refers to the accompanying drawings showing preferred embodiments of the invention without any limiting character.

FIG. 1 is a side view of a twisting tool of the invention.

FIG. 2 is a section view of the FIG. 1 tool on a diametral plane referenced II-II in FIG. 1.

MORE DETAILED DESCRIPTION

Figure 5:
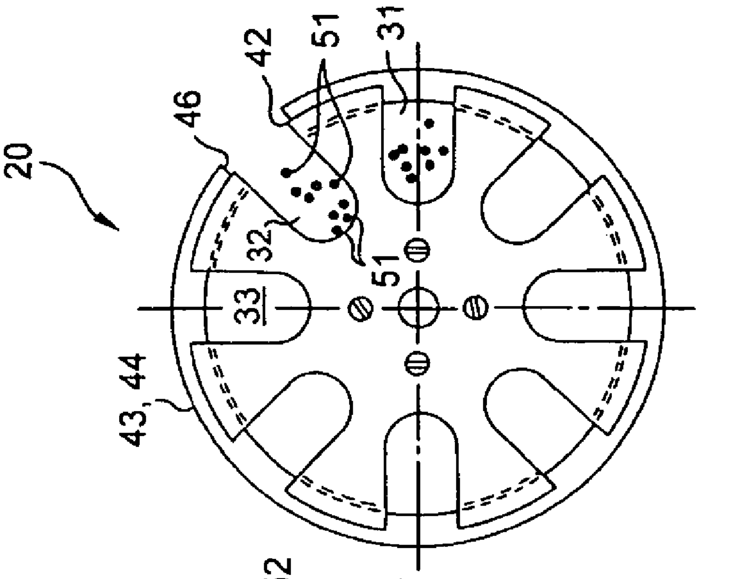
FIGS. 3 to 5 are side views showing three successive steps in a method of the invention using the tool of FIGS. 1 and 2 for twisting wires.

With reference to FIGS. 1 to 5 and 8 in particular, the twisting tool 20 comprises a body 21 generally in the form of a thick disk having an outside diameter 22 and presenting an axis of symmetry 23.

This body is made by using screws 24 to assemble together a central core 25 and two side plates 26 and 27; each of these three parts presents a disk shape sharing a common axis 23, with the diameter 22 of the side plates being greater than the diameter 28 of the core; the body thus presents a groove 29 extending around the periphery of the core between the side plates 26 and 27.

A central shaft 30 (FIGS. 1 and 2) on the axis 23 makes it easier to ensure that the parts 25 to 27 are assembled together on the same axis.

Before, or after these parts 25 to 27 are assembled together, eight peripheral slots 31 to 38 of identical shape are formed in said parts so as to be regularly spaced apart symmetrically about the axis 23.

Each of these slots presents two side walls 39, 40 that are substantially plane and that face each other, extending a bottom wall 41 of the slot that is substantially semicylindrical in shape.

The side walls of each slot extend to the periphery of the parts 25 to 27 of the body, with each slot opening out into the periphery via a respective opening 42.

The tool further comprises two substantially identical rings 43 and 44 received in part in the groove 29 and each presenting a portion that projects relative to the side plates of the body: the outside diameter 45 of the rings is greater that the outside diameter 22 of the side plates 26, 27.

These rings are substantially symmetrical about an axis that coincides substantially with the axis of symmetry 23 of the body and of the groove 29 in which the rings can slide in rotation about said axis 23, about the body 21.

Each of the rings presents a gap or interruption 46 of "width" or arc length 47 that exceeds the "width" or arc length 48 of an opening, such as the opening referenced 42; the length 47 of the interruption 46 is nevertheless shorter than the arc length 49 corresponding to the fraction of the body associated with each slot (in this example one-eighth); this makes it easier to insert wire segments "peripherally" into the slot (such as 31) that is placed in register with the interruption in each of the rings, and also makes it easier to extract wires extending through said slot, in the same configuration for releasing segments that are passing through the slot, by passing through the peripheral opening of the slot and through the gap formed in each of the two side-by-side rings.

Figure 4:
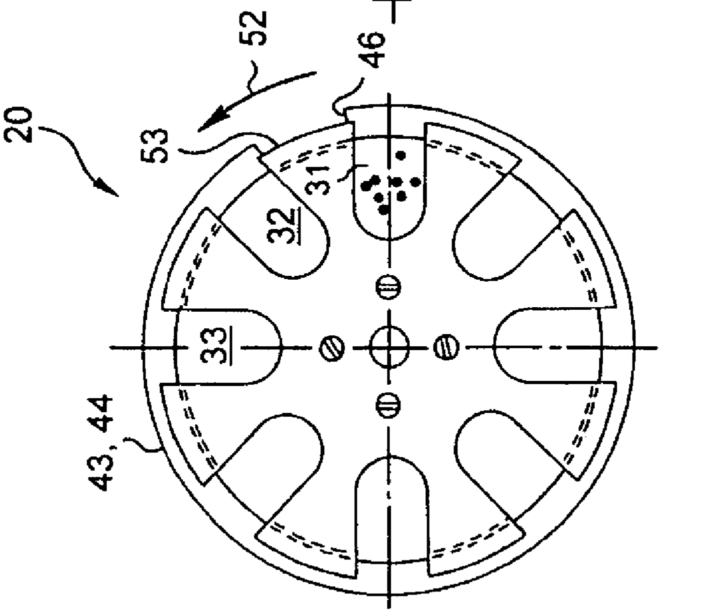
Figure 3:
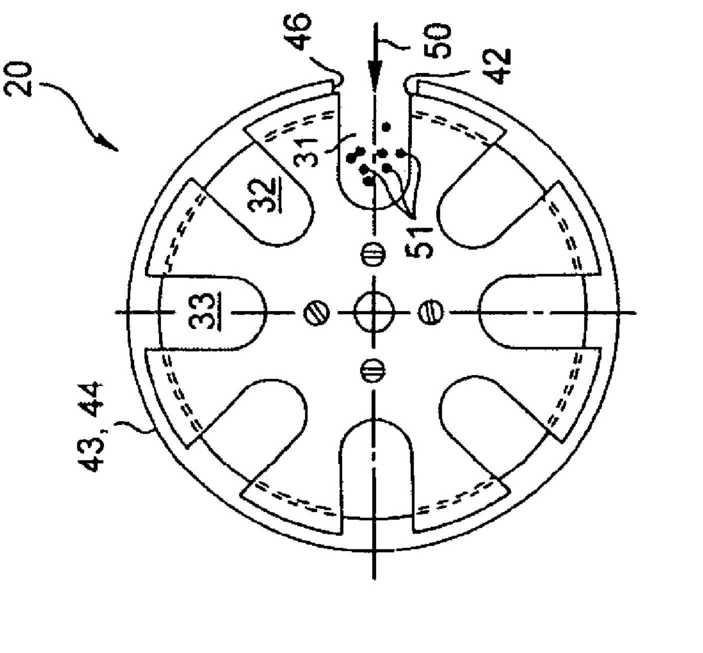

With reference to FIGS. 3 to 5, in the configuration shown in FIG. 3 which corresponds to the relative positions of the rings and the body shown in FIGS. 1 and 2, wire segments 51 are inserted radially, along arrow 50, into the slot 31 of the tool 20 by passing through the interruption 46 in each of the two rings 43 and 44 and also through the opening 42 of the slot 31.

With reference to FIG. 4, the operator causes both rings to pivot relative to the body in the direction of arrow 52; in the configuration shown in this figure, the interruptions 46 in the rings are in register with a peripheral portion 53 of the tool body lying between the slots 31 and 32; thus, the segments inserted into the slot 31 are held captive therein by ring portions closing the peripheral opening of said slot.

By continuing the pivoting movement of the rings about the tool body, the interruptions 46 of the rings 43, 44 come into register with the peripheral opening 42 of the slot 32, which corresponds to the configuration shown in FIG. 5.

In this configuration, wire segments 54 of a second batch are inserted radially into the slot 32.

In order to keep all of the segments 51 and 54 enclosed in the slots 31 and 32, the rings are turned further so as to bring their respective interruptions 46 into register with one or two portions between slots, such as the portion referenced 53 in FIG. 4.

Figure 8:
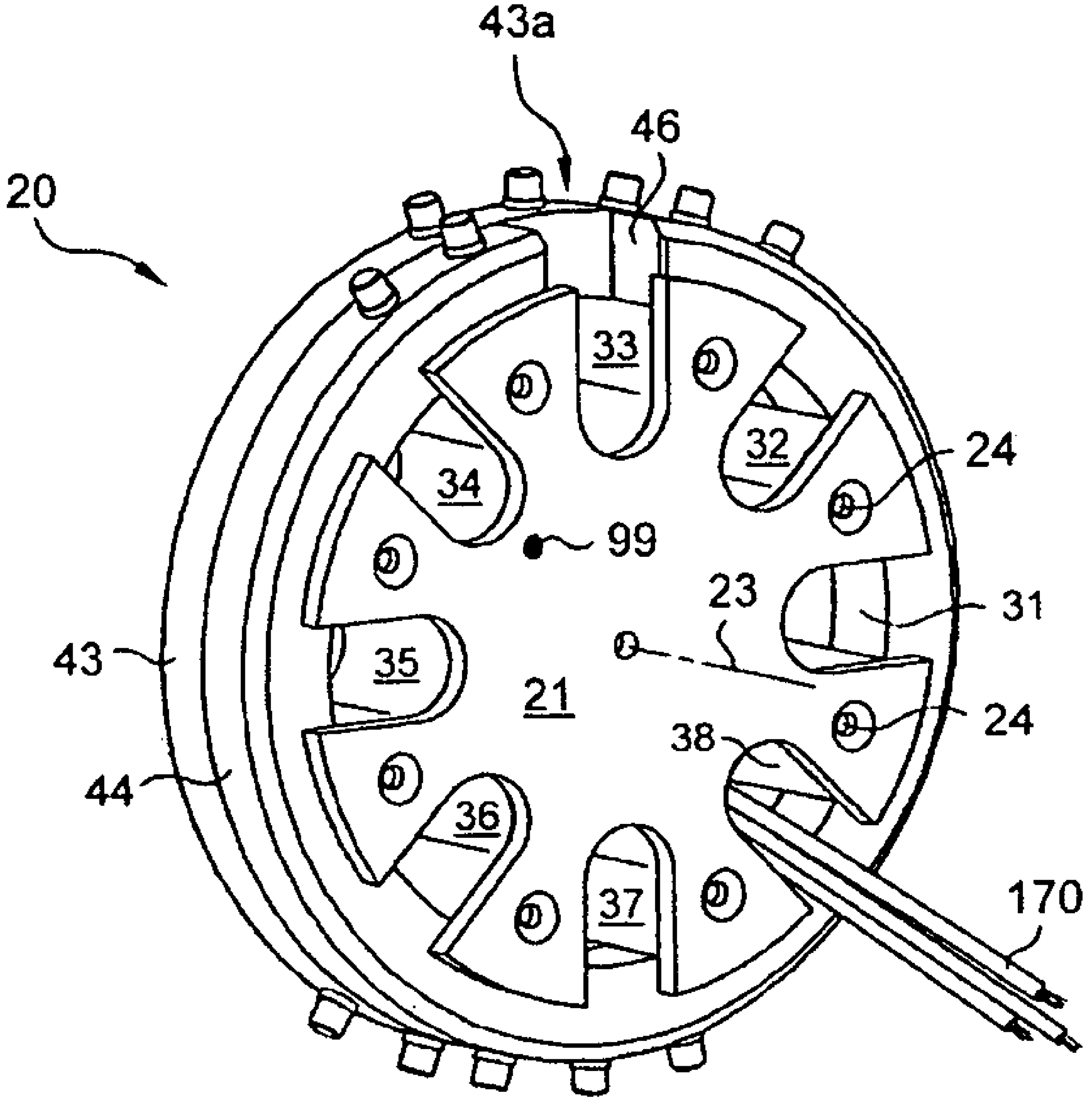
FIG. 8 is a diagrammatic perspective view of a twisting tool similar to that shown in FIGS. 1 and 2.

With reference to FIG. 8, a visible sign 99 such as a colored spot, a digit, or a letter, enables the angular position of the tool 20 about the axis 23 to be identified.

Furthermore, by turning the two rings 43 and 44 independently it is possible to obtain a tool configuration as shown in FIG. 8, in which a portion 43*a* of the ring 43 extends across the interruption 46 in the ring 44; in this configuration, both rings can be caused to pivot simultaneously about the axis 23 around the tool body through any angular distance without there being any danger of wire segments 170 that extend through any one of the slots being capable of escaping therefrom.

Figure 7:
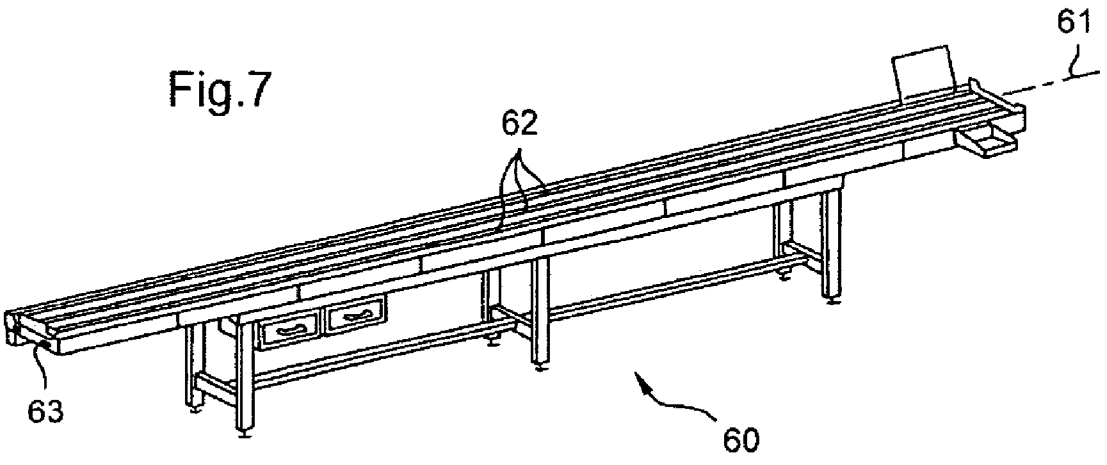
FIG. 7 is a diagrammatic perspective view of a harness support of apparatus of the invention.

FIG. 7 shows apparatus for manufacturing harnesses, which apparatus comprises a table 60 extending substantially horizontally and presenting a longitudinal axis 61.

The table has three parallel longitudinal slideways 62 extending substantially along the entire length thereof.

At one longitudinal end 63 of the table there is provided a connector support matching a connector fitted to a harness that is to be manufactured.

Figure 6:
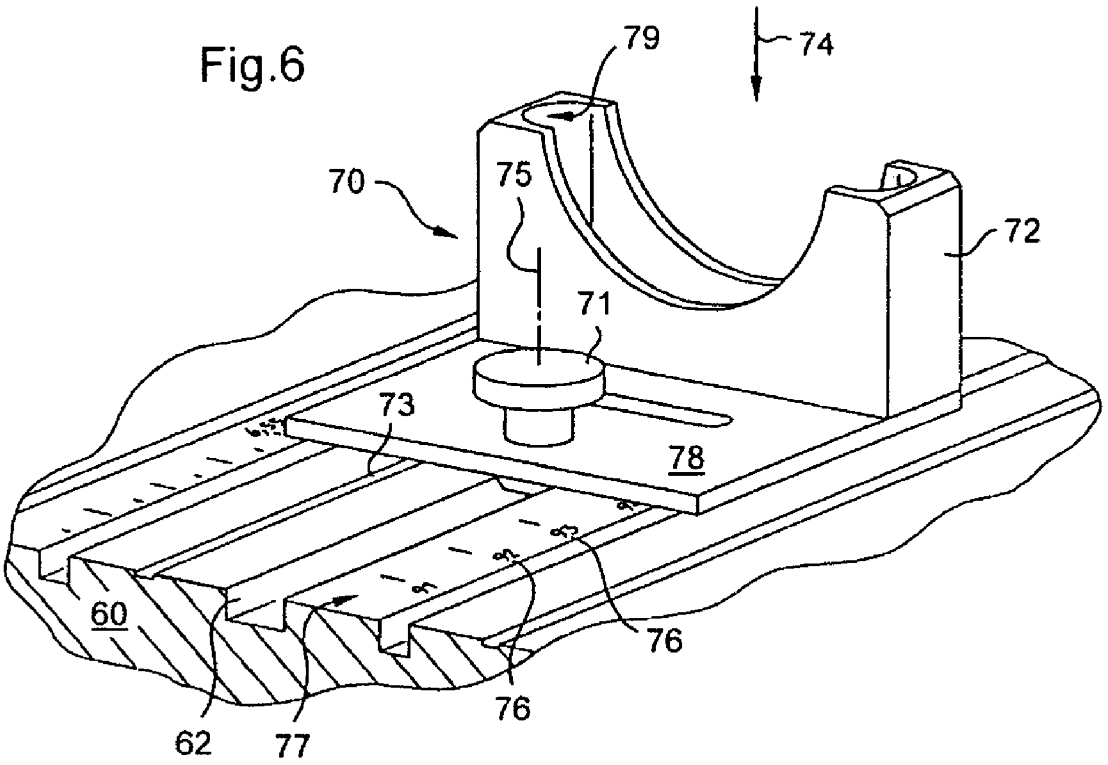
FIG. 6 is a diagrammatic perspective view of a twisting tool support disposed on a harness support in accordance with one aspect of the invention.

With reference to FIG. 6, the apparatus further comprises a support 70 for the twisting tool.

The support comprises a baseplate 78 whose bottom face rests on the table 60.

A screw of axis 75 presents a knurled head 71 and extends through an orifice drilled through the baseplate; the other end of the screw (not shown in FIG. 6) includes a connection member of shape that matches the cross-section of the slideway-forming hollow groove 62 so as to enable the twisting tool support 70 to be secured temporarily (reversibly) in any predetermined position along the table.

For this purpose, a plurality of graduations 76 are formed on the top face 77 of the table 60 so as to constitute a rule.

The twisting tool support 70 further comprises a cradle 72 designed to receive a twisting tool inserted along arrow 74, after wire segments of a harness for twisting have been engaged therein; the cradle is secured to the baseplate 78 and is in the form of a half-collar; the cradle has a groove 79 of profile matching the profile of the tool 20 that is to be received in the groove of the cradle.

In a preferred implementation of the invention, manufacturing a harness comprises the following successive operations:

a) inserting all of the wires constituting the harness in a main connector, the wires being segregated into packets corresponding to the branches of the harness;

b) engaging the main connector to the end 63 of the table 60 on its support that is locked in a first groove 62;

c) positioning tools in the groove 62 for holding bifurcations at predetermined locations for the branch being processed, which locations may be stored in a database and displayed to the operator;

d) engaging the wires in the slots of the twisting tool 20, with one packet of wires being engaged per slot; if there are few branches, it is also possible to share the wire segments of the main harness over a plurality of slots, for example two slots that are diametrically opposite:

e) to twist one branch:

e1) turning the twisting tool 20 about its own axis (which axis 23 is disposed substantially parallel to the axis 61) through about three revolutions while advancing the tool 20 along the axis 61 over about one meter;

e2) placing the tool 20 on its support 70;

e3) manually combing the set of wires in the portion of the harness that has not yet passed through the tool 20 so as to avoid forming any "knots";

e4) positioning at least one strap (collar, adhesive tape, or "tee-rap", for example) around the twisted portion of the harness that has passed through the tool 20; and e5) repeating steps e1) to e4) until the operator reaches a bifurcation;

f) for each bifurcation of the harness:

f1) removing from the tool 20 the packet of wire segments that corresponds to the branch that is not being treated;

f2) locking the released packet using a cable clamp fitted to the corresponding holding tool that was pre-positioned in step c); and f3) repeating step e) until the operator reaches the free end of a branch (a packet);

g) treating branch ends:

g1) disengaging the free end of the packet from the tool 20;

g2) cutting the wires to the defined length by the measurement on the rule (reference to the connector) as a function of branch length information made available to the operator; and g3) optionally inserting wires in the end connector; in the order to release the harness-building table, the operator might alternatively assemble the connectors at another workstation, after twisting all of the branches of the harness; and h) so long as there remains a branch that has not been twisted, the operator extracts the packet of wires relating to the non-twisted branch from the holding tool, extracts the already-twisted portion from the groove 62 and aligns the branch for twisting along the groove and the rule, and then repeats the procedure from step c).

What is claimed is:

1. Apparatus for manufacturing a harness of electrically conductive wire segments, the apparatus comprising a twisting tool (20) comprising a body (21) and at least two cavities (31 to 38) each opening out into the outside surface of the body via a peripheral opening (42), each cavity being associated with retaining means (43, 44) enabling at least a portion of wire segment to be retained in the cavity, and also with release means enabling said wire segment portion to be released from the cavity, and with opening means (46) enabling said wire segment portion to be inserted into the cavity, in which the retaining, release, and opening means comprise a hinged panel extending respectively across the peripheral opening (42) of each slot, and return means arranged to urge the hinged panel into a closure position.

2. The apparatus according to claim 1, in which the tool body (21) is substantially a body of revolution about an axis of symmetry (23).

3. The apparatus according to claim 2, in which the tool body is generally in the form of a sphere, a cylinder, or a disk.

4. The apparatus according to claim 2, in which the tool body presents slots or notches forming said cavities, each slot or notch extending substantially parallel to the axis of symmetry of the body, the body thus somewhat resembling the cylinder of a revolver.

5. The apparatus according to claim 1, in which the cavities are substantially regularly distributed around the periphery of the body.

6. The apparatus according to claim 1, in which the tool body has at least four cavities of substantially identical shapes and dimensions, each cavity being suitable for receiving a plurality of wire segments of different sections.

7. The apparatus according to claim 1, in which the tool body has at least eight cavities of substantially identical shapes and dimensions, each cavity being suitable for receiving a plurality of wire segments of different sections.

8. Apparatus for manufacturing a harness of electrically conductive wire segments, the apparatus comprising a twisting tool (20) comprising a body (21) and at least two cavities (31 to 38) each opening out into the outside surface of the body via a peripheral opening (42), each cavity being associated with retaining means (43, 44) enabling at least a portion of wire segment to be retained in the cavity, and also with release means enabling said wire segment portion to be released from the cavity, and with opening means (46) enabling said wire segment portion to be inserted into the cavity, in which the retaining, release, and opening means comprise an interrupted ring (43, 44) mounted to pivot around the tool body about an axis of symmetry (23) of the body, and suitable for extending across the peripheral openings (42) of the cavities.

9. The apparatus according to claim 8, having two interrupted rings both mounted to independently pivot around the tool body about its axis.

10. The apparatus according to claim 8, in which the interrupted portion (46) of each ring presents an arc length (47) that is less than or equal to the arc length (49) of the fraction of the periphery of the body associated with one slot or cavity.

11. The apparatus according to claim 10, in which the length (47) of the interruption in each ring is substantially equal to the arc length (48) occupied by the opening (42) of each slot or cavity.

12. Apparatus for manufacturing a harness of electrically conductive wire segments, the apparatus comprising a twisting tool (20) comprising a body (21) and at least two cavities (31 to 38) each opening out into the outside surface of the body via a peripheral opening (42), each cavity being associated with retaining means (43, 44) enabling at least a portion of wire segment to be retained in the cavity, and also with release means enabling said wire segment portion to be released from the cavity, and with opening means (46) enabling said wire segment portion to be inserted into the cavity, further comprising a harness support (60) that is elongate along a longitudinal support axis (61), together with slider means (62) extending parallel to said axis and designed to receive a sliding support (70) for the twisting tool (20).

13. The apparatus according to claim 12, further comprising locking means (71) for holding the twisting tool support in position at any point along the slider means.

14. The apparatus according to claim 12, further comprising a connector support disposed at a first longitudinal end (63) of the harness support, a member for securing a connector to the connector support, and a graduated rule (76) secured to the harness support and extending parallel to the longitudinal axis thereof.

* * * * *